US010843018B1

(12) United States Patent
Ike

(10) Patent No.: US 10,843,018 B1
(45) **Date of Patent: *Nov. 24, 2020**

(54) SELF-RECHARGING FIRE SPRINKLER SYSTEM

(71) Applicant: Gary Ike, Vancouver, WA (US)

(72) Inventor: Gary Ike, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,257

(22) Filed: Oct. 16, 2018

Related U.S. Application Data

(63) Continuation of application No. 15/410,663, filed on Jan. 19, 2017, now Pat. No. 10,143,871.

(60) Provisional application No. 62/281,049, filed on Jan. 20, 2016.

(51) Int. Cl.

| | |
|---|---|
| ***G05D 23/00*** | (2006.01) |
| ***A62C 35/60*** | (2006.01) |
| ***A62C 35/64*** | (2006.01) |
| ***A62C 37/50*** | (2006.01) |

(52) U.S. Cl.
CPC .............. *A62C 35/60* (2013.01); *A62C 35/64* (2013.01); *A62C 37/50* (2013.01)

(58) Field of Classification Search
CPC .......... A62C 35/60; A62C 35/64; A62C 37/50
USPC .......................................................... 700/282
See application file for complete search history.

(56) References Cited

U.S. PATENT DOCUMENTS

2011/0166714 A1* 7/2011 Stachnik ................ A62C 35/60 700/282
2012/0230846 A1* 9/2012 Stephens .................. A62C 3/00 417/279
2013/0228345 A1* 9/2013 Aho ........................ F04B 17/03 169/43
2013/0343910 A1* 12/2013 Stephens ................. F04B 49/06 417/44.1
2014/0271253 A1* 9/2014 Scheffer ................. A62C 35/68 417/53

* cited by examiner

*Primary Examiner* — Md Azad
(74) *Attorney, Agent, or Firm* — Schwabe, Williamson & Wyatt, P.C.

(57) ABSTRACT

In an example, an electronic device may monitor a rate of change of water pressure associated with a charged fire sprinkler system. The electronic device may determine whether the rate of change of water pressure is greater than a threshold. The electronic device may, in response to determining that the rate of change is not greater than the threshold, initiate a system recharge in which a fire pump of the fire sprinkler system is activated to attempt to recharge the water pressure.

18 Claims, 3 Drawing Sheets

100

100

300

SELF-RECHARGING FIRE SPRINKLER SYSTEM

CROSS REFERENCE TO RELATED APPLICATIONS

This application is a continuation of U.S. application Ser. No. 15/410,663, filed Jan. 19, 2017, which claims the benefit of U.S. Provisional Application No. 62/281,049, filed on Jan. 20, 2016, each of which is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to fire sprinkler systems, and some embodiments relate to a self-recharging fire sprinkler system.

DESCRIPTION OF THE RELATED ART

A fire sprinkler system may be "charged", e.g., filled to a predefined water pressure. After a fire sprinkler system is charged, the water pressure may drop over time due to incremental leaks in the piping system and/or through back-flow through a valve, such as an anti reverse check valve. If the water pressure falls too low, a fire pump controller may respond as if a fire sprinkler were opened—the fire pump may be activated to pump water to the sprinkler heads and an alarm may signal a remote monitoring station (to notify qualified personnel of an alarm monitoring service that the fire pump (e.g., the main fire pump) has operated into a run condition). The fire pump may be set so that it can only be stopped via the manual stop feature located on the door of the fire pump controller. Service personnel may be dispatched to manually stop the fire pump using this stop feature. To avoid this type of "false" alarms (specifically alarms triggered by leakage as opposed to an open sprinkler head), the fire sprinkler system may be serviced regularly, say weekly, to replenish the water pressure.

The frequency of service to avoid the type of false alarms described above may be reduced by installing a "jockey pump" (also called a "pressure maintenance pump") in the fire sprinkler system. However, the presence of this additional pump in the fire sprinkler system may increase the chance of a pump failure in the fire sprinkler system, and may be another component with moving parts that may need to be replaced or serviced over time (not to mention the additional pipe, valves, fittings, and electrical wiring required for the installation of the additional pump, which all may be new points of failure for the fire sprinkler system).

Also, although a jockey pump may output a fraction of the pumping capacity as the fire pump (say 10%); the total cost for adding the jockey pump may be a significant portion of the total cost of some fire sprinkler systems. Fire sprinkler systems may include 5 to 700 horsepower fire pumps ranging from 50 gallon a minute to 5000 gallons a minute. In a small fire sprinkler system, such as a residential fire sprinkler system having a 5-10 horsepower fire pump with a capability of 50 to 200 gallons a minute, the additional of the jockey pump can increase the total cost of a new system by as much as 20% (besides possible additions in repair/replacement costs related to the additional pump).

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1:
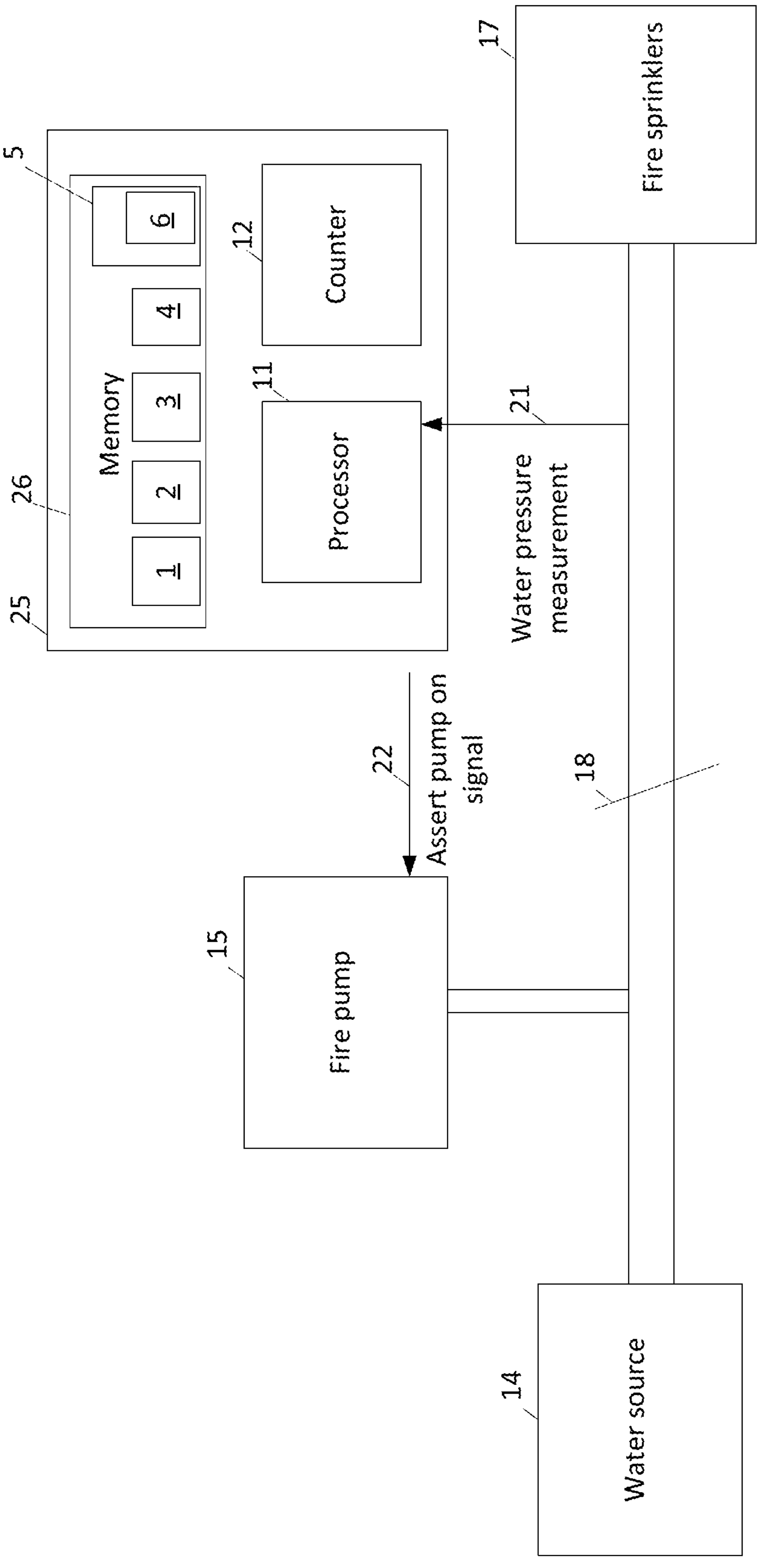
FIG. 1 illustrates a self-recharging fire sprinkler system.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for self-recharging fire sprinkler system.

Some examples include circuitry such as a processor to control self-charging by a fire sprinkler system. The circuitry may be integrated into the fire pump controller, or alternatively the circuitry may be located in a separate electronic device to control operations of the fire pump controller. The circuitry may control operations of the fire pump controller and/or may directly or indirectly control the fire pump to charge the fire sprinkler system without requiring the installation of a separate/additional pump (e.g., without a jockey pump) and/or without requiring a service call for every recharging of the fire sprinkler system. False alarms due to a drop in water pressure may be avoided inexpensively and in some examples without the use of additional moving parts and/or plumbing that may add points of failure to a fire sprinkler system.

The circuitry may monitor the rate of change when system pressure drops. If the rate of change is slow, indicating a slow leak and not a true system demand (e.g., open sprinkler head), the circuitry may command the fire pump controller to activate the fire pump to start, omit generation or transmission of a signal for the alarm, and automatically stop after a short time period as long as the system pressure has been raised above a threshold, such as at least to a predefined stop value. If the system pressure drops, and the rate of change is rapid, indicating a true system demand (e.g., an open sprinkler head due to, for instance, a fire), the one or more operations may be bypassed which may result in the fire pump starting, the pump run alarm output being activated (fire pump may be stopped via the manual stop feature on the fire pump controller door and/or the pump can stop automatically after a user selectable 10 minute minimum running time as long as the system stop pressure requirement has been met).

In some embodiments, a system to self-charge a fire sprinkler system may include a timer to begin counting at a predefined event, such as when discharge pressure feedback is falling and drops below the predefined stop value. The timer may count an amount time from this event until the feedback drops below a predefined start value. In some embodiments, if the timer operates for a predetermined duration, say 10-30 minutes, prior to a time that water pressure of the fire sprinkler system reaches the predefined start value, then the circuitry may initiate a system recharge.

In a system recharge, the circuitry may transmit a control signal to the fire pump and/or its controller to cause the fire pump to run for a minimum recharge time (a minimum recharge time may be a predefined value for instance 30 seconds, selectable at say installation or service, that may define the minimum fire pump run time for a system recharge). The circuitry may cause the fire pump to stop so long as the fire pump has run for at least the minimum recharge time and a measurement of the water pressure is at least equal to a threshold (such as the predefined stop value).

For a typical system recharge, the pump run alarm output may not activate. However, the circuitry may cause the pump run alarm output to activate if the threshold water pressure is not met at a predetermined time (such as at the end of the minimum recharge time). The circuitry may record a first value in an event log (e.g., system recharge) in the case that the threshold pressure is reached at the predetermined time.

FIG. 1 illustrates a self-recharging fire sprinkler system 100. The system 100 includes a fire pump 15 to deliver water from the water source 14 to the fire sprinklers 17, and an electronic device 25 including a processor 11 to control operation of the fire pump 15. The electronic device 25 may be integrated into a fire pump controller (not shown) of the fire pump 15 in some embodiments, or may be external from the fire pump controller in other embodiments. The processor 11 may control the fire pump 15 by signaling the fire pump controller to recharge the fire sprinkler system (e.g., to activate the fire pump 15 to replenish the water pressure between check valve 18 and the fire sprinkler heads of the fire sprinklers 17 responsive to leakage).

The electronic device 25 may include a memory 26 to store settings for the fire sprinkler system 100. The memory 26 may be a same memory to store instructions executable to transform a general purpose processor into the processor 11 (which may be a special purpose processing device), or may include a separate memory such as one or more registers. The memory 26 may store a first predetermined stop value 1 and a second predetermined start value 2 (e.g., pressure values). The second predetermined start value 2 may be a pressure at which the fire pump 15 is to start. The first predetermined stop value 1 may be any value in a range between the predetermined start value 2 and a maximum pressure capability of the fire sprinklers 17. The memory 26 may also store a value 3 (e.g., a time value and/or a count value) to be compared with a count of the counter 12. The memory 26 may also store a minimum recharge time 4. Some or all of the values 1-4 may be user selectable in various embodiments. The memory 26 may also include an event log 5 to store logging data generated by the processor 11.

In some examples, the processor 11 may be configured to initiate the counter 12 after or once a fire sprinkler system 100 is charged to a water pressure at least equal to the predefined stop value 1. Various start points for the counter 12 are possible and practical (e.g., a timer may be started responsive to completing a charging/re-charging of the fire sprinkler system 100, detecting water pressure dropping below the predetermined stop value 2, etc.) A event or condition for starting the counter 12 may be selected to determine a rate of change of the water pressure.

The processor 11 may be configured to (after starting the count) at intervals, e.g., periodically, obtain water pressure measurements 21 from a pressure sensor (not shown) to measure water pressure in plumbing/piping (e.g., between the check valve 18 and the sprinkler heads). The processor 11 may be configured to monitor the measurements 21 to identify any measurement that is not greater than a threshold (e.g., less than the second predefined start value).

The processor 11 may be configured to identify a value of the count in response to identifying one of the measurements 21 that is not greater than the second predefined start value 2. The processor 11 may be configured to compare the identified value to the value 3 and initiate a system recharge based on the comparison. The comparison is to indicate whether a rate of change of the water pressure is greater than a threshold (in which case the processor 11 may bypass a system recharge). In some embodiments, if the identified value is greater than the value 3 (which may be associated with a slow leak), the processor 11 may initiate the system recharge to attempt to recharge the fire sprinkler system 100.

The processor 11 may initiate a system recharge by commanding the fire pump 15 to activate. In some embodiments, the processor 11 may perform this commanding by transmitting a control signal to the fire pump controller to cause the controller to activate the fire pump (e.g., assert a pump on signal 22), in some embodiments. During the system recharge, the processor 11 may obtain one or more additional water pressure measurements from the sensor (e.g., obtain at least one water pressure measurement after the fire pump 15 is active for a duration corresponding to the value 4). The processor 11 may compare the additional measurement to a threshold such as the first predetermined stop value 1, and so long as the threshold is met, may allow the fire pump 15 to deactivate (in some examples, the processor 11 may stop commanding the fire pump controller to assert the pump on signal 22, causing the signal 22 to be discontinued). The processor 11 may add a recharge event entry 6 to the log 5 to record that a system recharge was successfully performed. The entry 6 may indicate various characteristics of the recharge event (for instance, the count, the time of start and/or completion of the event, measurements obtained during and/or before the event, or the like, or combinations thereof).

In contrast, if the additional measurement does not reach the threshold (e.g., is less than the predetermined stop value 1), the processor 11 may transmit a new signal to the fire pump controller and/or may not stop commanding the fire pump controller to assert the pump on signal 22. The processor 11 may cause the fire pump controller to issue an alarm, such as a pump run alarm. The fire pump 15 may run for a selectable minimum duration and/or until manually stopped. The processor 11 may enter a different type of entry into the log (e.g., an entry for a fire pump run/alarm event entry).

In the example above, circuitry of an electronic device integrated or external to the fire pump controller is to signal the fire pump controller (e.g., circuitry of the fire pump controller) to assert a pump on signal to activate the fire pump. In other examples, it may be possible and practical to manufacture an intelligent fire pump controller natively including circuitry that is to directly perform operations similar to some of the operations of the example fire sprinkler system 100. Accordingly, in some embodiments, a component that determines whether to perform a system recharge may be a same component asserts a pump on signal to the fire pump. In other examples, one component may generate and transmit a signal that is passed through by another component to the fire pump. In yet other examples, one component may generate a first signal that is transmitted to another component to cause it to generate a second signal (e.g., a fire pump assert signal) and transmit the second signal to a fire pump. Any of these components may include circuitry such as a general purpose processor to execute stored instructions, a field programmable gate array, or the like, or combinations thereof.

Figure 2:
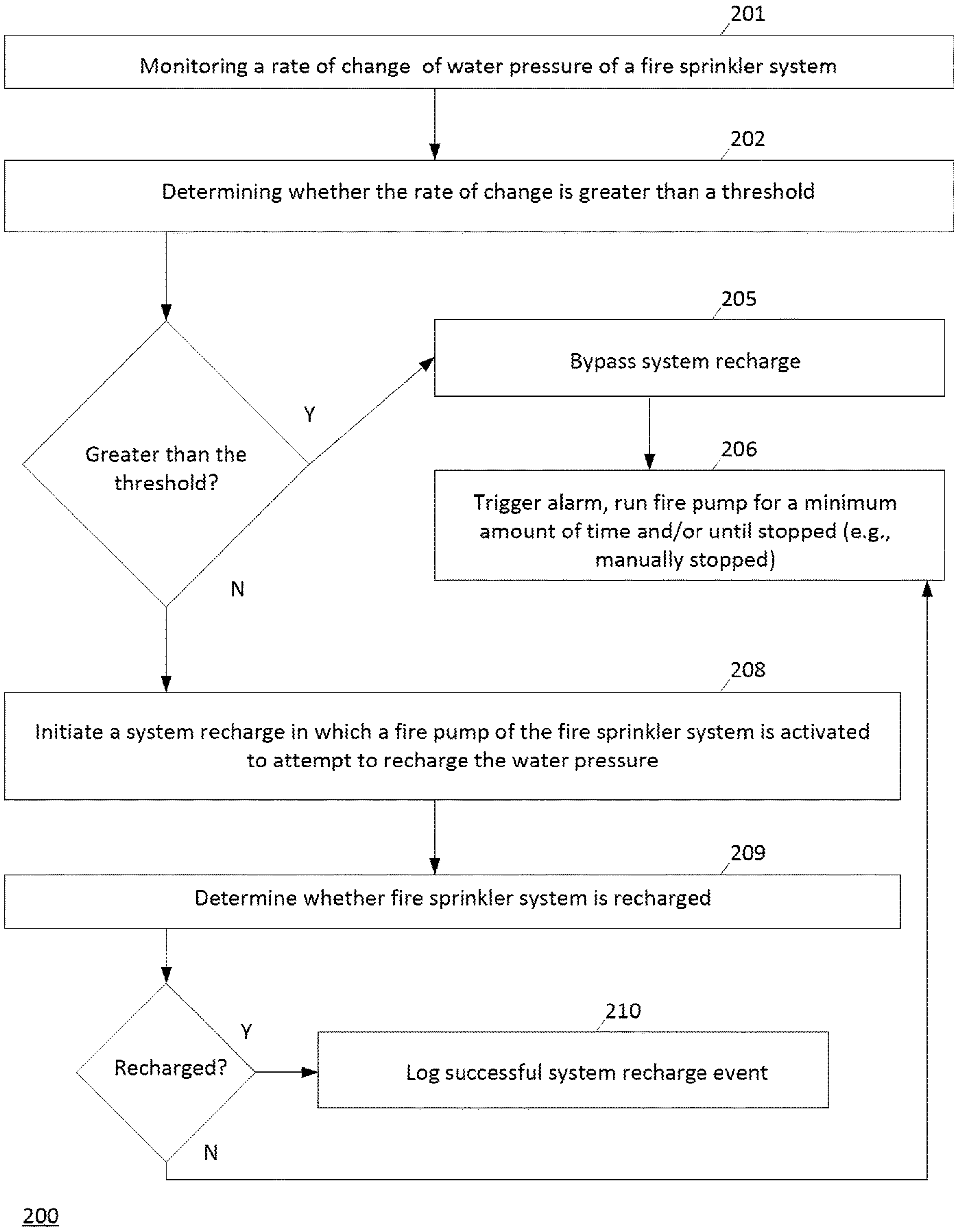
FIG. 2 illustrates a process that may be performed by the system of FIG. 1, in some embodiments.

FIG. 2 illustrates a process that may be performed by the fire sprinkler system 100 of FIG. 1, in some embodiments. In block 201, the fire sprinkler system 100 may monitor a rate of change of water pressure of the fire sprinkler system. In block 202, the fire sprinkler system 100 may determine whether the rate of change is greater than a threshold.

If the rate of change is not greater than the threshold, then in block 208 the fire sprinkler system 100 may initiate a system recharge in which fire pump 15 (FIG. 1) is activated to attempt to recharge the water pressure. In block 209, the fire sprinkler system 100 may determine whether the water pressure is recharged. If the water pressure is recharged, the fire sprinkler system 100 may log a successful system recharge event in block 210.

If the rate of change is greater than the threshold from the determination of block 202, then in block 205 the fire sprinkler system 100 may bypass the system recharge. The fire sprinkler system 100 may trigger an alarm and may run the fire pump 15 for a minimum amount of time and/or until stopped (e.g., manually stopped). Also, if the fire sprinkler system 100 determines, in block 209, that the water pressure is not recharged, then the fire sprinkler system 100 may in block 206 trigger the alarm and may run the fire pump 15 for additional time (up to for instance the minimum amount of time) and/or until stopped (e.g., manually stopped). The minimum amount of time in block 206 may be different (e.g., greater than) a minimum amount of time for running the pump in block 209.

Figure 3:
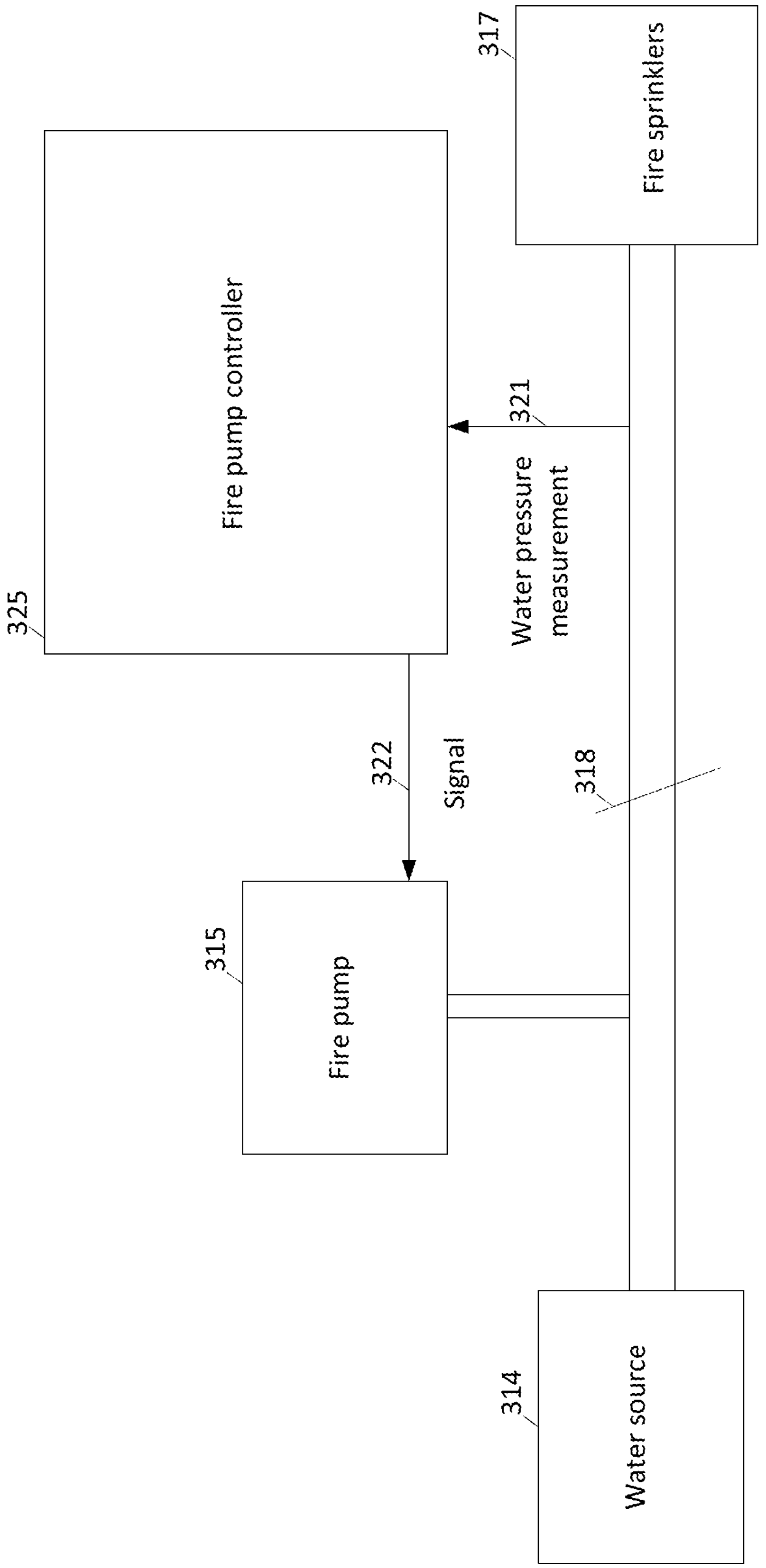
FIG. 3 illustrates another self-recharging fire sprinkler system.

FIG. 3 illustrates another self-recharging fire sprinkler system 300. The system 300 may include a water source 314, a value 318, fire sprinklers 317, and a fire pump 315, which may be similar to the water source 14, the value 18, the fire sprinklers 17, and the fire pump 15 of FIG. 1. The system 300 may include a fire pump controller 325 (e.g., an intelligent fire pump controller to identify a rate of change of water pressure and determine whether or not to perform a system recharge or not based on the rate of change). The fire pump controller 325 configured to perform some or all of the operations of the process 200 (FIG. 2), or any other operations described herein such as those performed by the processor 11 (FIG. 1).

The fire pump controller may check water pressure measurements 321 similar to how the processor 11 (FIG. 1) obtains the water pressure measurements 21. The fire pump controller 325 may generate one or more signals 322 to control the fire pump. In some examples, the signals 322 may include a pump on signal that is asserted to activate the fire pump 315 or de-asserted to deactivate the fire pump 315. In some examples, the signals 322 may include a first signal to be transmitted in a system recharge to cause the fire pump to run for a first selectable predefined duration (e.g., 30 seconds) and a second different signal to be transmitted when the system recharge is bypassed to cause the fire pump to run until manually stopped and/or for a second selectable predefined duration (e.g., 10 minutes). The second signal may also trigger an alarm or a third signal may be transmitted in connection with the transmission of the second signal, to trigger the alarm. The fire pump controller 315 may suppress an alarm signal, not transmit the third signal, or the like, or combinations thereof to prevent an alarm to be triggered in a system recharge.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical self-charging fire sprinkler system is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

EXAMPLES

Example 1 is a memory device having instructions stored thereon that, in response to execution by a processing device, cause the processing device to perform operations comprising: monitoring the rate of change of water pressure associated with a fire sprinkler system; determining whether the rate of change of water pressure is greater than a threshold; and in response to determining that the rate of change is not greater than the threshold, command a fire pump system to enter a first predetermined state.

Example 2 includes the subject matter of example 1, and the predetermined state corresponds to activation of the fire pump and omission of the pump run alarm signal.

Example 3 includes the subject matter of example 2, and the activation of the fire pump comprises activation for an amount of time (e.g., a minimum amount of time).

Example 4 includes the subject matter of example 3, and the operations further comprise: selecting the amount of time based on a measurement associated with the monitoring.

Example 5 includes the subject matter of example 1, and the operations further comprise: in response to determining that the rate of change is greater than the threshold, do not command the fire pump system to enter a first predetermined state.

Example 6 includes the subject matter of example 1, and the operations further comprise: in response to determining that the rate of change is not greater than the threshold, suppress a pump run alarm signal; and in response to determining that the rate of change is greater than the threshold, do not suppress the pump run alarm signal.

Example 7 includes the subject matter of example 1, and the first predetermined state includes active firm pump, and wherein the operations further comprise after commanding the fire pump system, commanding the fire pump system to enter a second predetermined state that is different than the first predetermined state.

Example 8 includes the subject matter of example 7, wherein the second predetermined state comprises inactive fire pump.

Example 9 includes the subject matter of example 8, and the operations further comprise perform the commanding the fire pump system to enter the second predetermined state X seconds after performing the commanding the fire pump system to enter the first predetermined state; and determining X based on a measurement of said rate of change.

Example 10 includes the subject matter of example 1, and the operations further comprise: detecting a pressure drop associated with the fire sprinkler system; and initiating the monitoring responsive to said detection.

Example 11 is a memory device having instructions stored thereon that, in response to execution by a processing device, cause the processing device to perform operations comprising: detecting a pressure drop associated with the fire sprinkler system; performing a measurement of water pressure associated with the fire sprinkler system responsive to said detection; ascertaining whether the measurement is greater than a threshold; determining an amount of time based on the measurement; and in response to determining that the rate of change is not greater than the threshold, command a fire pump controller to activate for the determined amount of time.

Example 12 includes the subject matter of example 11, and the operations further comprise suppressing a first pump controller alarm signal that is associated with activation of the first pump controller responsive to low pressure.

Having described and illustrated the principles of the invention in a preferred embodiment thereof, it should be apparent that the invention may be modified in arrangement and detail without departing from such principles.

The invention claimed is:

1. A fire sprinkler system having a single fire pump, the fire sprinkler system further comprising:

control circuitry coupled to the single fire pump, the control circuitry configured to:

following a charging of the fire sprinkler system, monitor a rate of change of water pressure of the fire sprinkler system;

determine whether the rate of change of the water pressure of the fire sprinkler system is greater than a threshold;

in response to a determination that the rate of change of the water pressure of the fire sprinkler system is greater than the threshold, transmit a first control signal configured to activate both the single fire pump and a pump run alarm of the fire sprinkler system; and in response to a determination that the rate of change of the water pressure of the fire sprinkler system is not greater than the threshold, transmit a second control signal configured to activate the single fire pump without activation of the pump run alarm to initiate a maintenance recharge in which the single fire pump of the fire sprinkler system is activated to attempt to recharge the fire sprinkler system.

2. The fire sprinkler system of claim 1, wherein the control circuitry is further configured to:

in response to a determination that the rate of change of the water pressure of the fire sprinkler system is greater than the threshold or an identification that the attempt to recharge the fire sprinkler system failed, terminate the maintenance recharge to cause the single fire pump to continue to run and an alarm to be transmitted using the pump run alarm.

3. The fire sprinkler system of claim 1, wherein the control circuitry is further configured to:

ascertain whether the water pressure of the fire sprinkler system reaches a stop value after activation of the single fire pump; and transmit a signal to deactivate the single fire pump responsive to a result of the ascertaining.

4. The fire sprinkler system of claim 3, wherein the control circuitry is configured to transmit the signal to deactivate only if the water pressure of the fire sprinkler system reaches the stop value.

5. The fire sprinkler system of claim 1, wherein transmit the second control signal further comprises suppress an activation of the pump run alarm.

6. The fire sprinkler system of claim 5, wherein the control circuitry is further configured to:

determine whether the attempt to recharge the fire sprinkler system failed; and in response to a determination that the attempt to recharge the fire sprinkler system failed, discontinue the suppression of the activation of the pump run alarm.

7. A fire sprinkler system, comprising:

an individual fire pump to operate in a plurality of pumping modes, wherein when the same individual fire pump operates in a first pumping mode of the pumping modes the same individual fire pump drives more gallons per minute of water than the same individual fire pump drives in a second different pumping mode of the pumping modes; and a memory device having instructions stored thereon that, in response to execution by a processing device, cause the processing device to perform operations comprising:

following a charging of the fire sprinkler system, monitoring a rate of change of water pressure of the fire sprinkler system;

determining whether the rate of change of the water pressure of the fire sprinkler system is greater than a threshold;

in response to determining that the rate of change of the water pressure of the fire sprinkler system is greater than the threshold, transmitting, by the circuitry, a first control signal configured to activate both the same individual fire pump in the first pumping mode and a pump run alarm of the fire sprinkler system; and in response to determining that the rate of change of the water pressure of the fire sprinkler system is not greater than the threshold, transmitting a second control signal configured to activate the same individual fire pump in the second pumping mode without activating the pump run alarm to initiate a maintenance recharge in which the same individual fire pump of the fire sprinkler system is activated to attempt to recharge the fire sprinkler system.

8. The fire sprinkler system of claim 7, wherein the operations further comprise:

in response to determining that the rate of change of the water pressure of the fire sprinkler system is greater than the threshold or identifying that the attempt to recharge the fire sprinkler system failed, terminating the maintenance recharge to cause the same individual fire pump to continue to run and an alarm to be transmitted using the pump run alarm.

9. The fire sprinkler system of claim 7, wherein the operations further comprise:

ascertaining whether the water pressure of the fire sprinkler system reaches a stop value after activation of the same individual fire pump; and transmitting a signal to deactivate the same individual fire pump responsive to a result of the ascertaining.

10. The fire sprinkler system of claim 9, wherein the signal to deactivate is to be transmitted only if the water pressure of the fire sprinkler system reaches the stop value.

11. The fire sprinkler system of claim 7, wherein transmitting the second control signal further comprises suppressing an activation of the pump run alarm.

12. The fire sprinkler system of claim 11, wherein the operations further comprise:

determining whether the attempt to recharge the fire sprinkler system failed; and in response to a determination that the attempt to recharge the fire sprinkler system failed, discontinuing the suppression of the activation of the pump run alarm.

13. A memory device having instructions stored thereon that, in response to execution by a processing device, cause the processing device to perform operations comprising:

following a charging of a fire sprinkler system having an individual fire pump to operate in a plurality of pumping modes, monitoring a rate of change of water pressure of the fire sprinkler system, wherein when the same individual fire pump operates in a first pumping mode of the pumping modes the same individual fire pump drives more gallons per minute of water than the same individual fire pump drives in a second different pumping mode of the pumping modes;

determining whether the rate of change of the water pressure of the fire sprinkler system is greater than a threshold;

in response to determining that the rate of change of the water pressure of the fire sprinkler system is greater than the threshold, transmitting, by the processing device, a first control signal configured to activate both the same individual fire pump in the first pumping mode and a pump run alarm of the fire sprinkler system; and in response to determining that the rate of change of the water pressure of the fire sprinkler system is not greater than the threshold, transmitting a second control signal configured to activate the same individual fire pump in the second pumping mode without activating the pump run alarm to initiate a maintenance recharge in which the same individual fire pump of the fire sprinkler system is activated to attempt to recharge the fire sprinkler system.

14. The memory device of claim 13, wherein the operations further comprise:

in response to determining that the rate of change of the water pressure of the fire sprinkler system is greater than the threshold or identifying that the attempt to recharge the fire sprinkler system failed, terminating the maintenance recharge to cause the same individual fire pump to continue to run and an alarm to be transmitted using the pump run alarm.

15. The memory device of claim 13, wherein the operations further comprise:

ascertaining whether the water pressure of the fire sprinkler system reaches a stop value after activation of the same individual fire pump; and transmitting a signal to deactivate the same individual fire pump responsive to a result of the ascertaining.

16. The memory device of claim 15, wherein the signal to deactivate is to be transmitted only if the water pressure of the fire sprinkler system reaches the stop value.

17. The memory device claim 13, wherein transmitting the second control signal further comprises suppressing an activation of the pump run alarm.

18. The memory device claim 17, wherein the operations further comprise:

determining whether the attempt to recharge the fire sprinkler system failed; and in response to a determination that the attempt to recharge the fire sprinkler system failed, discontinuing the suppression of the activation of the pump run alarm.

* * * * *